(12) United States Patent
Li et al.

(10) Patent No.: US 9,832,144 B2
(45) Date of Patent: Nov. 28, 2017

(54) METHOD AND DEVICE FOR IMPLEMENTING INSTANT COMMUNICATION

(71) Applicant: Tencent Technology (Shenzhen) Company Limited, Shenzhen, Guangdong (CN)

(72) Inventors: Yuhuang Li, Shenzhen (CN); Xingyi Zhang, Shenzhen (CN); Xiaoxiang Zuo, Shenzhen (CN); Xin Xie, Shenzhen (CN); Shiqi Xu, Shenzhen (CN); Xianxian Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 263 days.

(21) Appl. No.: 14/270,881

(22) Filed: May 6, 2014

(65) Prior Publication Data

US 2014/0244772 A1   Aug. 28, 2014

Related U.S. Application Data

(63) Continuation of application No. PCT/CN2013/087230, filed on Nov. 15, 2013.

(30) Foreign Application Priority Data

Jan. 4, 2013 (CN) .......................... 2013 1 0001295

(51) Int. Cl.
  *G06F 15/16* (2006.01)
  *H04L 12/58* (2006.01)
  *H04L 12/18* (2006.01)

(52) U.S. Cl.
  CPC .......... *H04L 51/04* (2013.01); *H04L 12/1813* (2013.01); *H04L 12/1818* (2013.01); *H04L 51/32* (2013.01)

(58) Field of Classification Search
  CPC ......... G06F 17/30867; G06F 17/30749; H04L 63/101; H04L 67/306; H04L 67/22
  (Continued)

(56) References Cited

U.S. PATENT DOCUMENTS 5,381,412 A * 1/1995 Otani ..................... H04N 7/147
                                                  348/14.01
8,365,081 B1 * 1/2013 Amacker ............... G06Q 10/10
                                                  705/27.1
(Continued)

FOREIGN PATENT DOCUMENTS

CN     201010208623      6/2010
CN     102045387 A       5/2011
(Continued)

OTHER PUBLICATIONS

International Search Report issued in corresponding PCT application PCT/CN2013/087230; pp. 1-3, dated Feb. 20, 2014.
(Continued)

*Primary Examiner* — Tesfay Yohannes
(74) *Attorney, Agent, or Firm* — Anova Law Group, PLLC

(57) ABSTRACT

A method and device are described for implementing instant communication. Information indicating that a first user is logged into an instant communication interface is obtained. On-line users are displayed to the first user in response to the login of the first user. A first user selects an object to follow from the on-line users and, information about the selected object to follow is received in response to the first user selecting the object to follow from the on-line users. The first user may be set into a first instant communication room in which the selected object to follow resides, for performing instant communication. The device includes: an obtaining module, a displaying module and a processing module. In
(Continued)

this manner communication between strangers is facilitated and the efficiency of making friends is enhanced.

19 Claims, 10 Drawing Sheets

(58) Field of Classification Search
USPC .......................... 709/206, 223, 224; 455/518
See application file for complete search history.

(56) References Cited

U.S. PATENT DOCUMENTS

| | | | | |
|---|---|---|---|---|
| 8,578,009 | B1* | 11/2013 | Newstadt | G06Q 10/107 709/206 |
| 8,738,764 | B1* | 5/2014 | Schepis | G06F 21/6218 709/224 |
| 2003/0009536 | A1 | 1/2003 | Henderson et al. | |
| 2006/0106675 | A1* | 5/2006 | Cohen | G06Q 10/06 705/26.1 |
| 2006/0177023 | A1* | 8/2006 | Vaghar | H04M 3/53333 379/88.17 |
| 2008/0153531 | A1* | 6/2008 | O'Shaughnessy | H04L 67/24 455/518 |
| 2008/0155567 | A1* | 6/2008 | O'Shaughnessy | G06Q 10/109 719/321 |
| 2009/0064045 | A1* | 3/2009 | Tremblay | G06F 3/0482 715/835 |
| 2010/0251142 | A1* | 9/2010 | Geppert | G06F 3/04817 715/758 |
| 2011/0113060 | A1* | 5/2011 | Martini | G06Q 10/10 707/769 |
| 2013/0073470 | A1* | 3/2013 | White | G06Q 10/10 705/304 |

FOREIGN PATENT DOCUMENTS

| | | |
|---|---|---|
| CN | 102202011 A | 9/2011 |
| CN | 102281207 A | 12/2011 |
| CN | 102377822 A | 3/2012 |

OTHER PUBLICATIONS

Written Opinion of the International Searching Authority issued in corresponding PCT application PCT/CN2013/087230; pp. 1-6; pp. 1-6, dated Feb. 20, 2014.
The State Intellectual Property Office of the People's Republic of China (SIPO) Office Action 1 for 201310001295.X dated Oct. 9, 2017, 7 Pages (including translation).

* cited by examiner

METHOD AND DEVICE FOR IMPLEMENTING INSTANT COMMUNICATION

CROSS REFERENCE TO RELATED APPLICATION

This application is a continuation of International PCT Application No. PCT/CN2013/087230, filed on Nov. 15, 2013, which claims the benefit of priority to Chinese Patent Application No. 201310001295.X, with State Intellectual Property Office of PRC, filed on Jan. 4, 2013, entitled "METHOD AND DEVICE FOR IMPLEMENTING INSTANT COMMUNICATION," both of which are incorporated herein by reference in their entireties.

FIELD OF THE DISCLOSURE

The present disclosure relates to communication technology, and in particular, to a method and device for implementing instant communication.

BACKGROUND OF THE DISCLOSURE

With the development of communication technology, a user can not only browser web pages and obtain various information, but also conduct text chat, audio/video calls and the like, via the network.

At present, a method for implementing an audio/video call is as follows. A user initiates an audio/video call request to a determined counterpart, and after the request is received by the counterpart, an audio/video call connection is established between the two users, through which the audio/video call can be implemented.

However, in the existing method for implementing the audio/video call, a user can only initiate an audio/video call request to a determined counterpart, which limits communication with strangers.

SUMMARY OF THE DISCLOSURE

A method and device for implementing instant communication are provided in the embodiments of the disclosure.

In one aspect, a method is provided for implementing instant communication, which includes:

obtaining information that a first user is logged into an instant communication interface;

displaying on-line users to the first user in response to the login of the first user; and receiving, in response to the first user selecting an object to follow from the on-line users, information about the object to follow, and setting the first user into a first instant communication room in which the selected object to follow resides, for performing instant communication.

In another aspect, a device is provided for implementing instant communication, which includes:

an obtaining module, configured to obtain information that a first user is logged into an instant communication interface;

a displaying module, configured to display on-line users to the first user in response to the login of the first user; and a processing module, configured to receive, in response to the first user selecting an object to follow from the on-line users, information about the object to follow, and set the first user into a first instant communication room in which the object to follow resides, for performing instant communication.

The advantage effects of the technical solutions provided in the embodiment of the disclosure are as follows.

With the method according to the embodiment of the disclosure, after the information that a first user is logged into an instant communication interface is obtained, on-line users are displayed, information about an object to follow selected by the first user from the on-line users is received, and the user is set into a first instant communication room in which the object to follow resides, for performing instant communication. Hence, the user does not need to propose a request for instant communication to a determined counterpart, the communication between strangers is facilitated, and the efficiency of making friends is enhanced.

BRIEF DESCRIPTION OF THE DRAWINGS

In order to illustrate the technical solutions according to the embodiments of the present disclosure more clearly, drawings used in the description of the embodiments will be described briefly hereinafter. Apparently, the drawings described hereinafter include only some embodiments of the present invention, and other drawings may be obtained by those skilled in the art according to those drawings without creative labor.

DETAILED DESCRIPTION

To make the object, technical solutions and advantage of the disclosure clearer, the embodiments of the disclosure will be described in detail in conjunction with the drawings.

Figure 1:
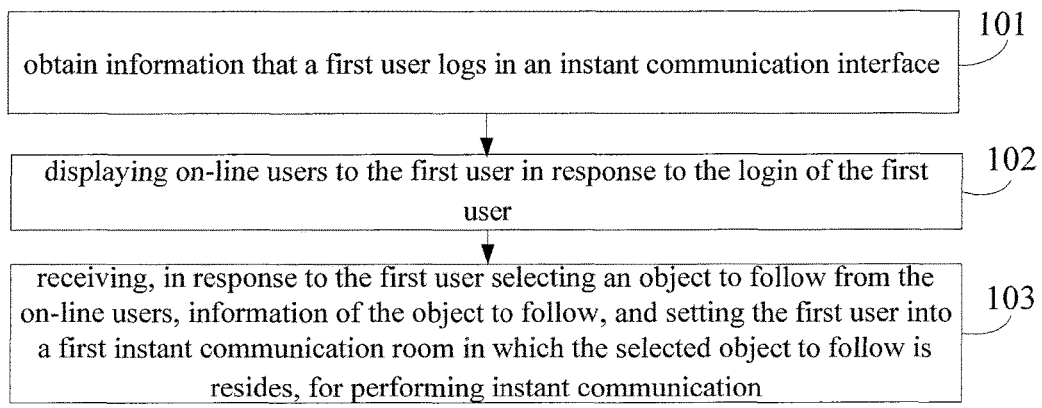
FIG. 1 is a flow chart of a method for implementing instant communication according to one embodiment of the disclosure.
Figure 2A:
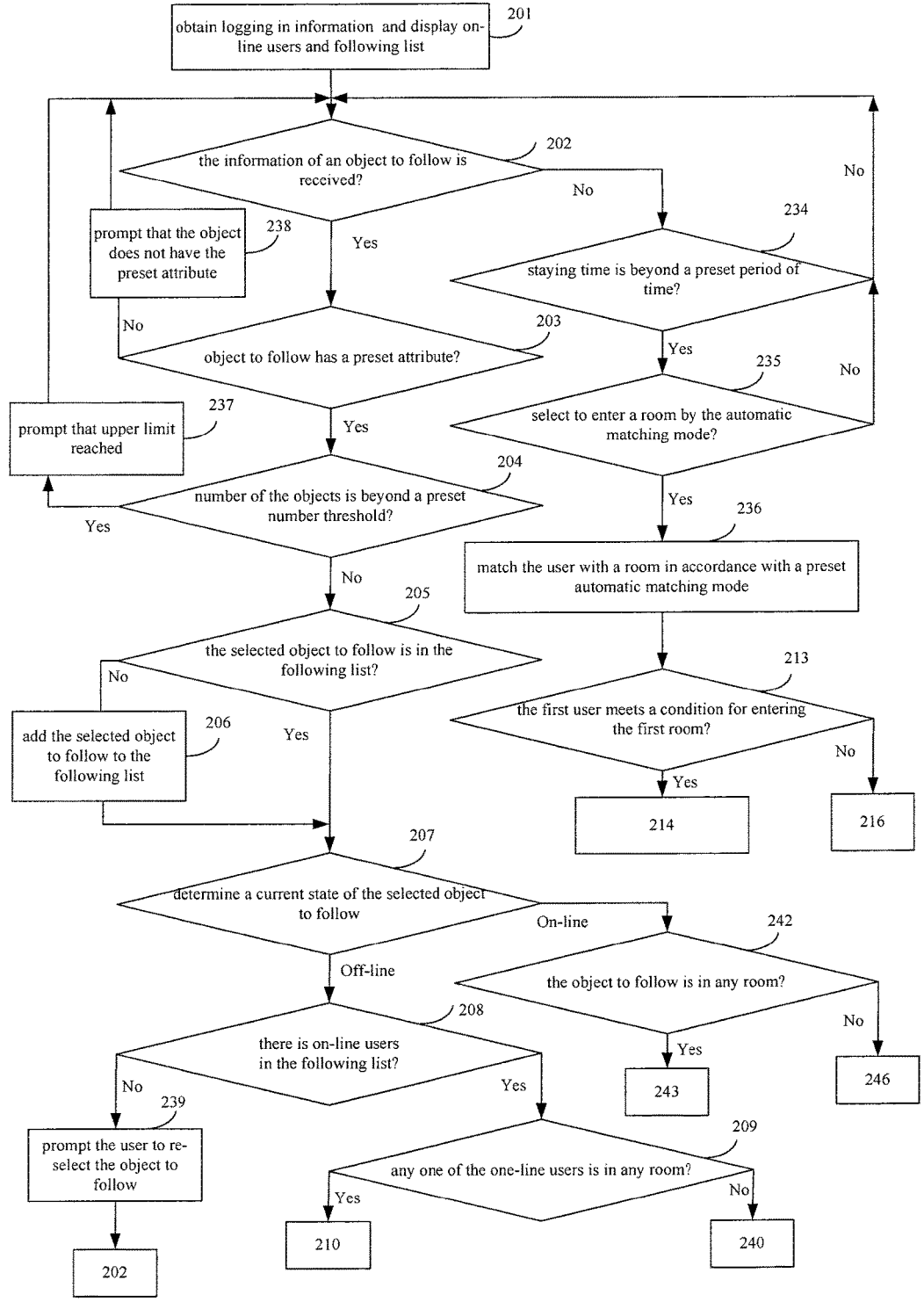
FIG. 2*a* to FIG. 2*e* are flow charts of a method for implementing instant communication according to another embodiment of the disclosure.
Figure 2B:
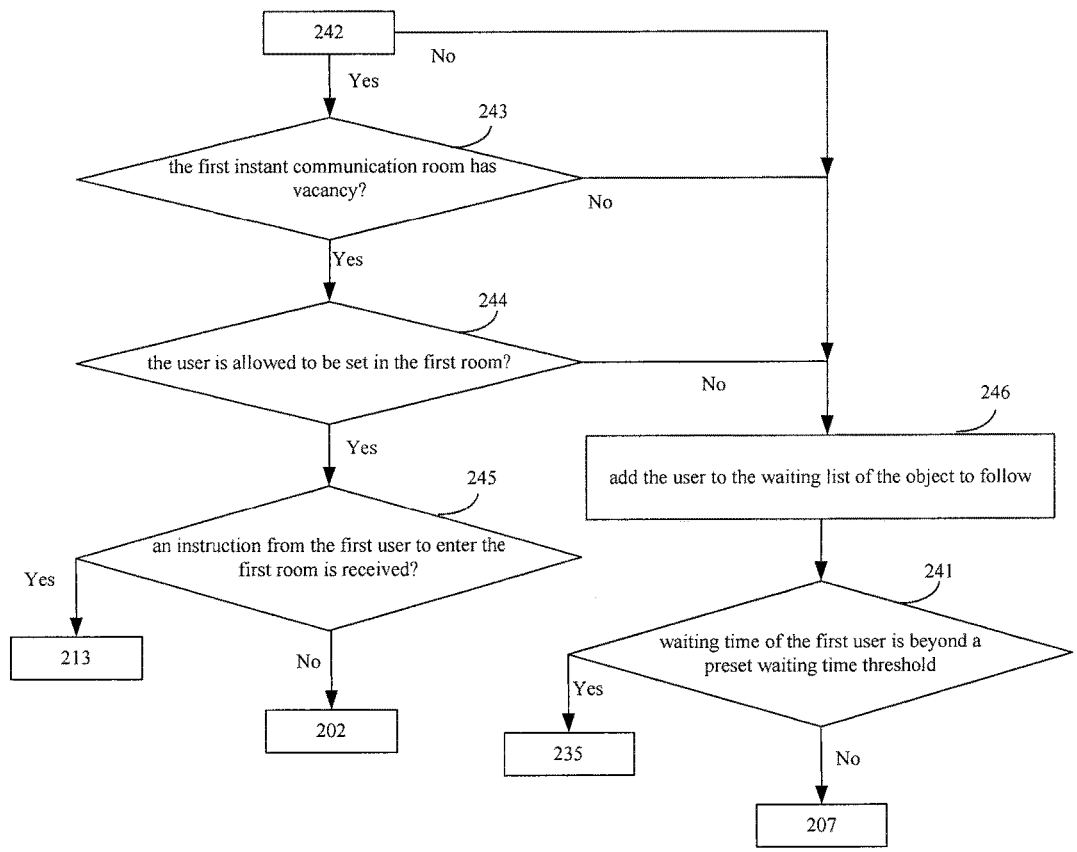
Figure 2C:
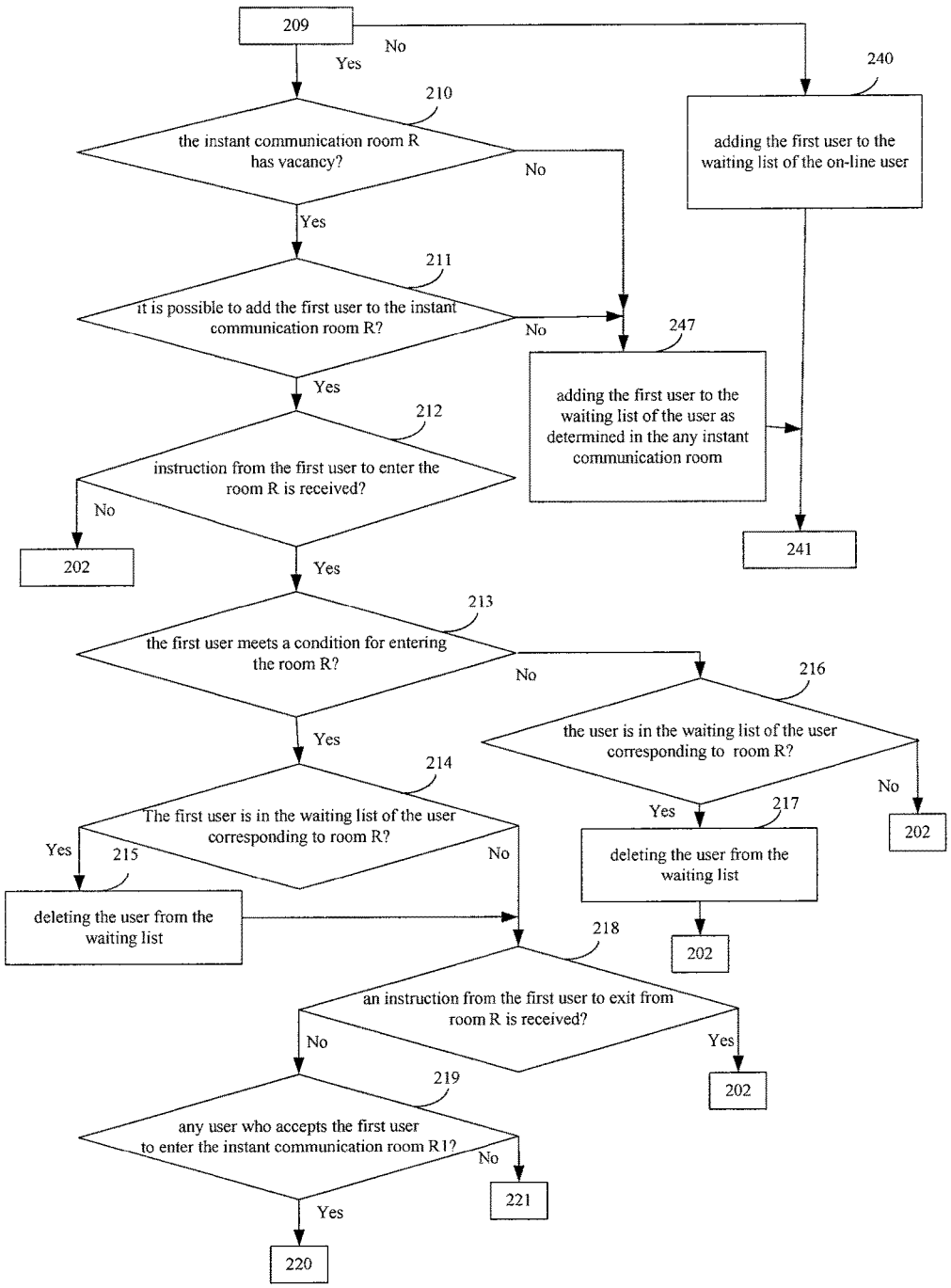
Figure 2D:
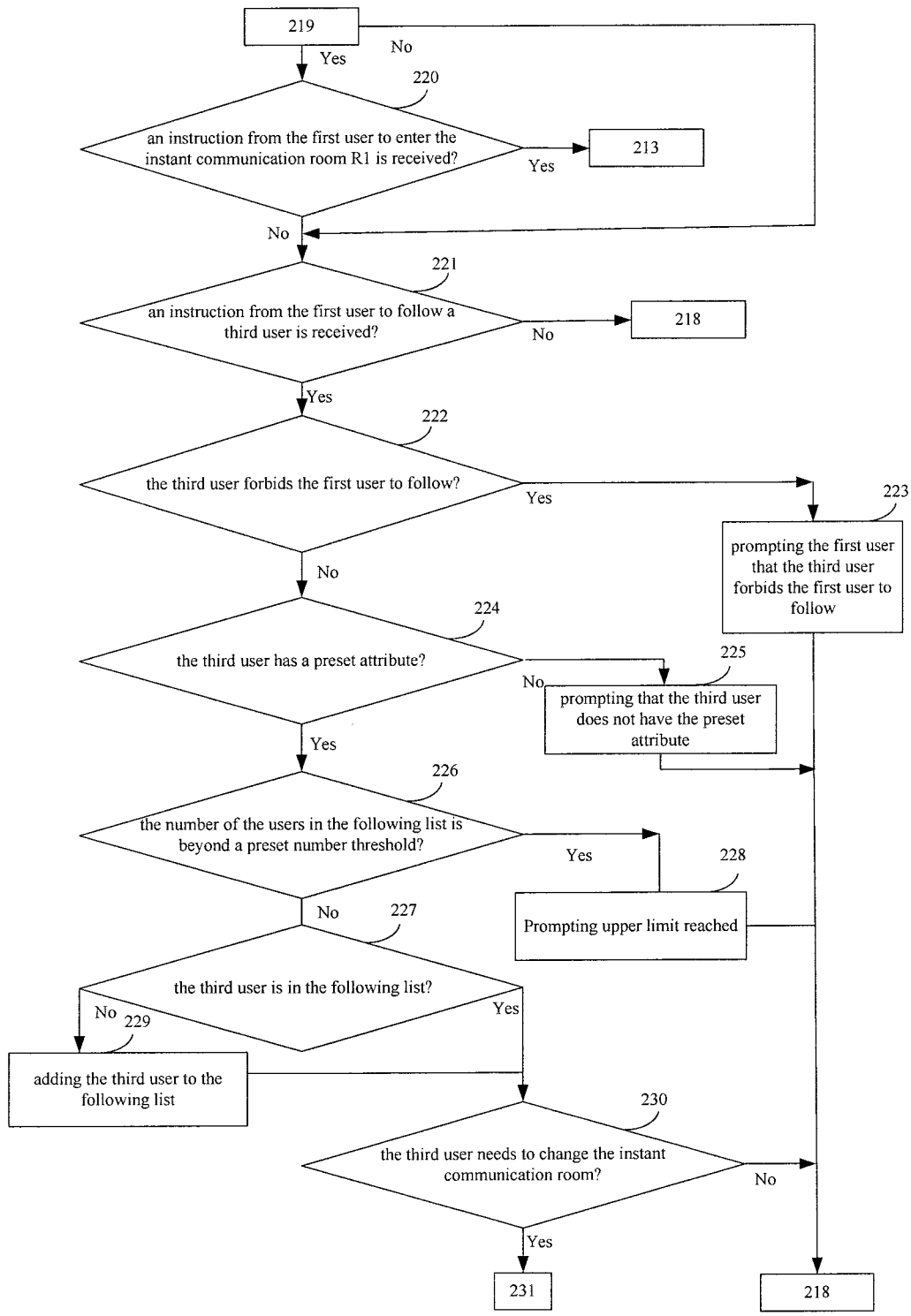
Figure 2E:
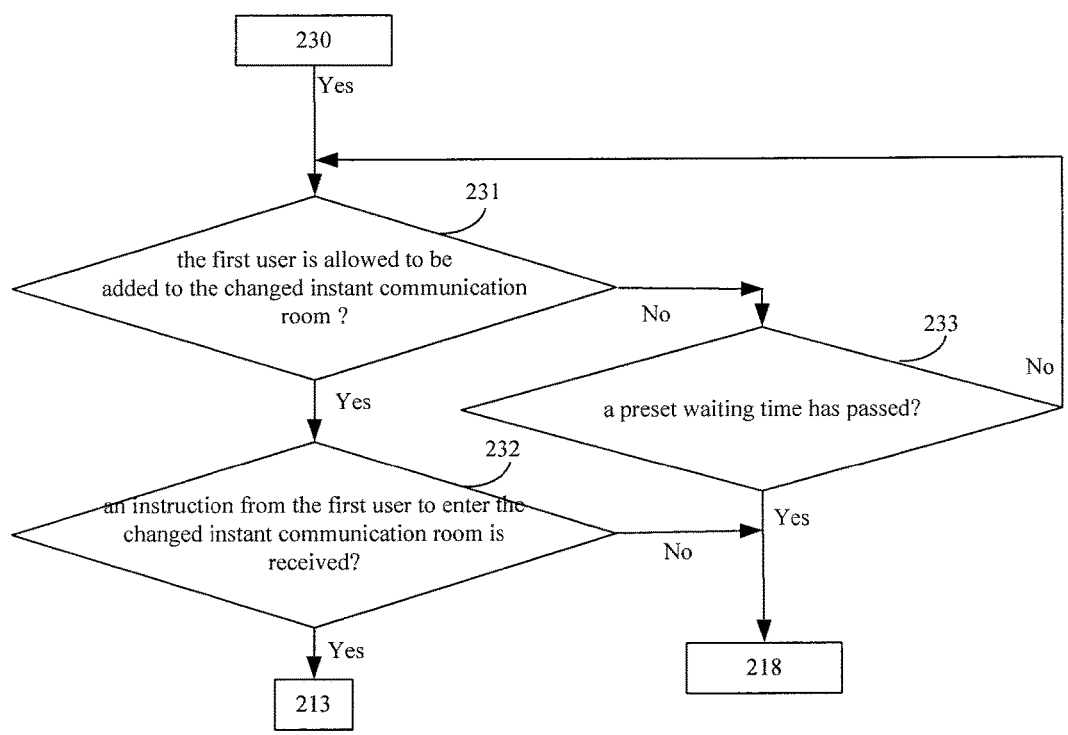

A method for implementing instant communication is provided according to an embodiment of the disclosure. Referring to FIG. 1, the method includes the following steps 101 to 103.

Step 101: obtaining information that a first user is logged into an instant communication interface;

Step 102: displaying on-line users to the first user in response to the login of the first user; and Step 103: receiving, in response to the first user selecting an object to follow from the on-line users, information about the object to follow, and setting the first user into a first instant communication room in which the selected object to follow resides, for performing instant communication.

Used herein, the term "user" refers to a virtual person corresponding to a real subscriber, who represents the will of the subscriber and executes operations such as login, chat, select, communication and the like.

Used herein, the term "object to follow" refers to a user corresponding to a person or an entity which the first user is interested in. For an instance, the first user may wish to chat with the object to follow and therefore wish to be in a same chat room as the object to follow. For another example, the first user may wish to play a game with the object to follow and wish to enter the game room of the object to follow and participate in the game in which the object to follow is involved. The object to follow may be a stranger to the first user or may be a relative or friend to the first user, and the present disclosure is not limited in this aspect.

Used herein, the term "instant communication room" refers to a virtual room established for an instant communication, in which the users may implement the instant communication. For example, the instant communication room may be a virtual room established with respect to a video game and the users in this room may participate in a same game session to play the video game together. For another example, the instant communication room may be a chat room in which the users may chat with each other. The present disclosure is not limited to the particular implementations of the instant communication room.

In an exemplary implementation, displaying on-line users to a first user in response to a login of the first user may include:

displaying a following list of the first user based on the information that the first user is logged into the instant communication interface, wherein the following list includes a name and/or an identity number of at least one user who has been followed by the first user.

Accordingly, receiving, in response to the first user selecting an object to follow from the on-line users, information about the object to follow selected by the first user from the on-line users, includes:

receiving, in response to the first user selecting the object to follow from the following list, information about the object to follow.

In an exemplary implementation, setting the first user into a first instant communication room may include:

setting the first user into the first instant communication room in the case that a preset instant communication condition is met, wherein the preset instant communication condition includes at least one of: whether the selected object to follow has a preset attribute, whether the number of the users in the following list is not beyond a preset threshold number, whether the selected object to follow is in the following list, whether the selected object to follow is on-line, whether the selected object to follow is in any instant communication room, whether the first instant communication room has vacancy, whether it is possible to set the first user into the first instant communication room, whether an instruction from the first user to enter the first instant communication room is received, and whether the first user meets a condition for entering the first instant communication room.

In an exemplary implementation, the method may further include: after setting the first user into the first instant communication room, inquiring among the users in the following list, and selecting a second user from the users in the following list, wherein the second user accepts the first user to enter the second instant communication room in which the second user resides;

when an instruction from the first user to enter the second instant communication room is received, determining whether the first user meets the condition for entering the second instant communication room; and if the first user does not meet the condition, prompting that the first user does not meet the condition for entering the second instant communication room.

In an exemplary implementation, the method may further include: in the case that the instruction from the first user to enter the second instant communication room is not received, obtaining an instruction from the first user to follow a third user who resides in the same instant communication room as the user;

determining whether the third user forbids the first user to follow; and if the third user forbids the first user to follow, prompting that the third user forbids the first user to follow.

In an exemplary implementation, the method may further include: if the first instant communication room has no vacancy, adding the first user to a waiting list of the selected object to follow; and if waiting time of the first user is beyond a preset waiting time threshold and an instruction from the first user to select to enter an instant communication room using an automatic matching mode is received, matching the first user to an instant communication room using the preset automatic matching mode.

In an exemplary implementation, the method may further include: in instances when it is determined not to be possible to set the first user into the first instant communication room, adding the first user to a waiting list of the selected object to follow.

In an exemplary implementation, matching the first user to an instant communication room using the preset automatic matching mode may include:

obtaining characteristic parameters of the first user and characteristic parameters of the user who is allowed to be added to the instant communication room that has the vacancy, wherein the characteristic parameters of the first user includes a basic characteristic parameter and a derived characteristic parameter, with the basic characteristic parameter including at least one of age, gender and geographic location, and the derived characteristic parameter including at least one of education, social stratum, income level, opening index and network charm index; and comparing the characteristic parameters of the first user with the characteristic parameters of the user who is allowed to be added to the instant communication room that has the vacancy, and obtain the instant communication room matching the first user.

After the information that a first user is logged into an instant communication interface is obtained, on-line users are displayed, information about an object to follow selected by the first user from the on-line users is received, and the user is set into a first instant communication room in which the object to follow resides, for performing instant communication. Hence, the user does not need to propose a request for instant communication to a determined counterpart, the communication between strangers is facilitated for there is no limitation on the users, and the efficiency of making friends is enhanced. While the on-line users are displayed, the following list can be displayed so that the user can select the object to follow from the on-line users or from the following list for expanding the selection. Further, the user can select to enter the first instant communication room, which is flexible and convenient for the user. In addition, it is convenient that an instant communication room can be matched with the user automatically.

It is to be noted that used herein, the term instant communication includes text chat, audio call, video call or the like, which is not limited herein.

A method for implementing instant communication is provided according to this embodiment of the disclosure. Referring to FIGS. 2a to 2e, the method includes the following steps 201 to 247.

Step 201: obtain information that a first user is logged into an instant communication interface, and display on-line users and a following list of the first user to the first user in response to the login of the first user.

In the following list, the name and/or identity number (which can be QQ number, micro-blogging number or the like) of at least one user that has been followed by the first user are included. In instances when the first user logs-in the instant communication interface for the first time, the following list includes no user and is null. The object followed by the first user is the one with whom the first user expects to perform instant communication by entering the instant communication room where the object resides.

Specifically, after the information that the first user is logged into the instant communication interface is obtained, the on-line users are displayed in the form of a head wall. The first user can select an object to follow from the on-line users displayed on the head wall, enter the first instant communication room in which the object to follow resides for performing instant communication.

Figure 3:
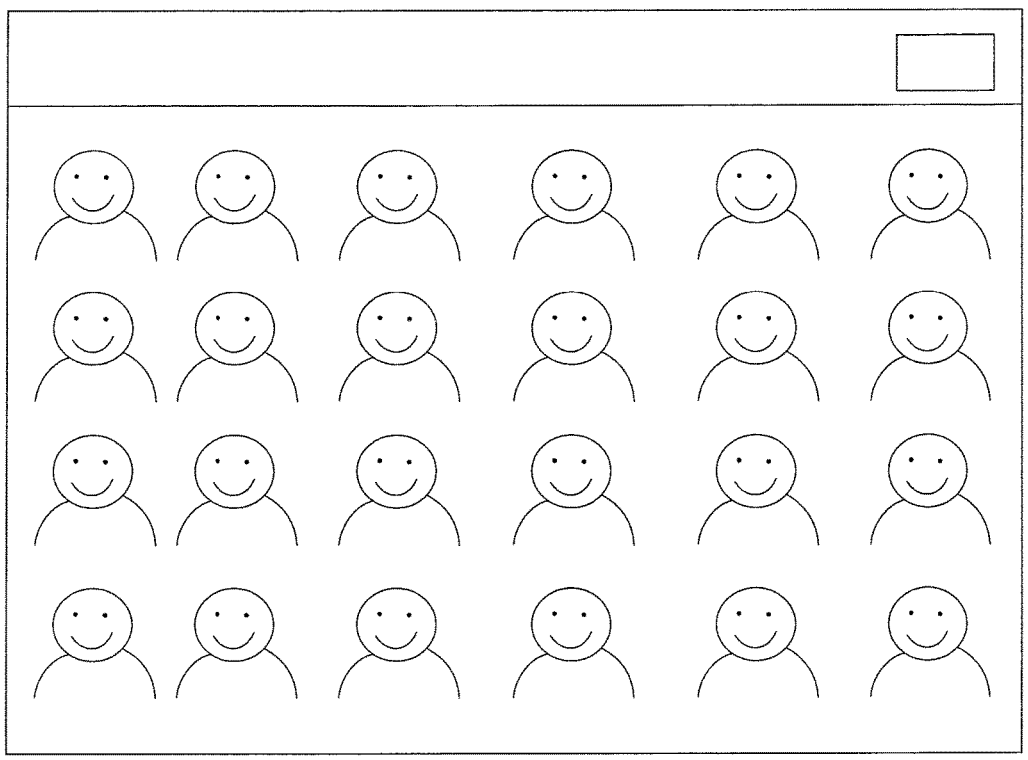
FIG. 3 is a schematic diagram of a head wall according to an embodiment of the disclosure.

Referring to FIG. 3, the on-line users can be displayed on the head wall by: displaying l popular users, m users in the instant communication room and n free users.

The popular user refers to a user who has a number of followers beyond a preset number threshold (such as 100 or the like). The user in the instant communication room refers to a user who resides in any instant communication room currently. The free user refers to a user who is logged into the instant communication interface but has not entered any instant communication room. The numbers l, m and n are natural numbers and can be set as required.

Further, a changing button can be provided for changing the on-line users displayed on the head wall.

The on-line users can be displayed in any other way, such as displaying according to the gender of the users, for example, displaying x male users and y female users, where x and y are natural numbers, and can be set as required.

Step 202: determine whether the information about an object to follow is received, proceeding to step 203 if the information is received in response to the first user selecting the object to follow from the on-line users or from the following list of the first user, or proceeding to step 234 if the information is not received.

The information about the object to follow selected by the first user may include: name, ID number, gender, age of the object to follow and the like.

Figure 4:
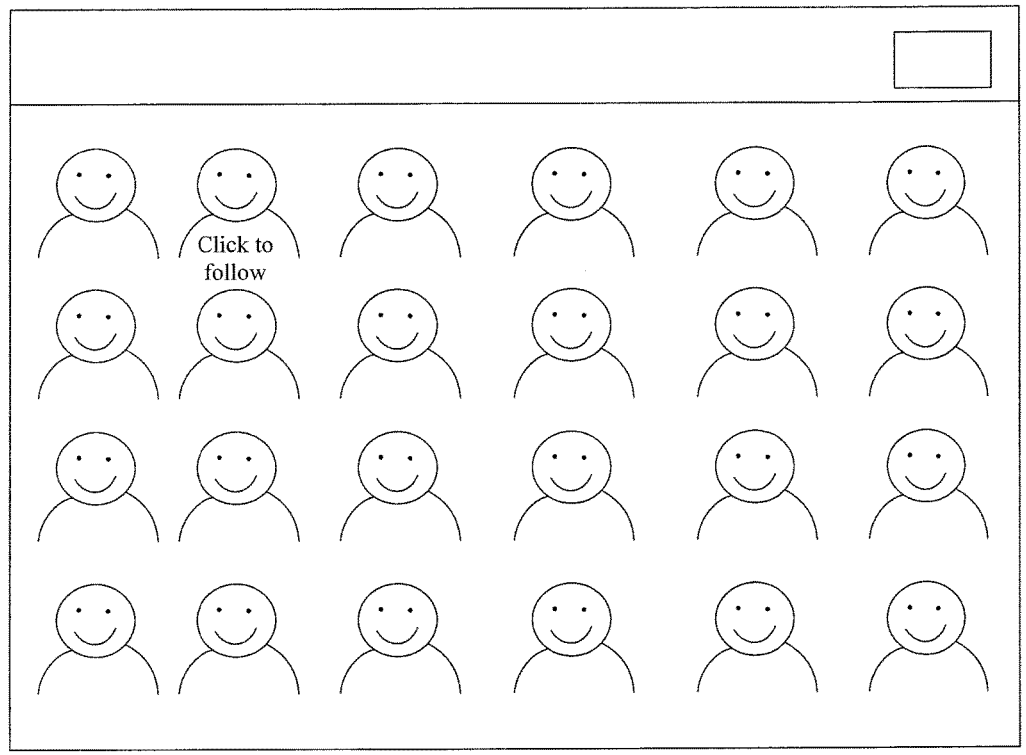
FIG. 4 is a schematic diagram of head wall according to another embodiment of the disclosure.

The first user can select the object to follow by: clicking a certain user on the head wall; right-clicking at the position of a certain user on the head wall and selecting to follow from the properties; clicking a certain on-line user in the following list; right-clicking at the position of a certain on-line user in the following list and select to follow from properties; or providing any other available implementing manners for the first user to select, which is not limited herein. Referring to FIG. 4, the first user can follow by clicking the icon "click to follow."

Step 203: determining whether the selected object to follow has a preset attribute, proceeding to step 204 if the selected object to follow has the preset attribute, proceeding to step 238 if the selected object to follow does not have the preset attribute.

Step 204: determining whether the number of the users in the following list is beyond a preset number threshold, proceeding to step 237 if the number of the users in the following list is beyond the preset number threshold, proceeding to step 205 if the number of the users in the following list is not beyond the preset number threshold.

The preset number threshold can be 10, 100 or the like, which can be set as required. Further, levels can be set for the users, and different number thresholds can be set for users in different levels.

Step 205: determining whether the selected object to follow is in the following list, proceeding to step 207 if the selected object to follow is in the following list, proceeding to step 206 if the selected object to follow is not in the following list.

Step 206: adding the selected object to follow to the following list, and proceeding to step 207.

Step 207: determining a current state of the selected object to follow, proceeding to step 208 if the selected object to follow is off-line, proceeding to step 242 if the selected object to follow is on-line.

The on-line state includes a state in which the user is in an audio/video interface, a state in which the user is in an instant communication room, or the like.

Step 208: determining whether there is any on-line user in the following list, proceeding to step 209 if there is any on-line user in the following list, proceeding to step 239 if there is no on-line user in the following list.

Step 209: determining among the on-line users in the following list whether any one is in any instant communication room, proceeding to step 210 if among the on-line users in the following list there is any one in any instant communication room, proceeding to step 240 if among the on-line users in the following list no one is in any instant communication room.

Step 210 (shown in FIG. 2c): determining whether the instant communication room R where the user as determined in any instant communication room in step 209 resides has vacancy, proceeding to step 211 if the instant communication room R has vacancy, proceeding to step 247 if the instant communication room R has no vacancy.

Step 211: determining whether it is possible to add the first user to the instant communication room R, proceeding to step 212 in instances when it is possible to add the first user to the instant communication room R, proceeding to step 247 in instances when it is determined not to be possible to add the first user to the instant communication room R.

If it is determined from steps 209-211 that there are multiple users in any instant communication room who accept to add the first user into their instant communication room(s) (the first user is allowed to be set in their instant communication room), one of the multiple users can be selected in a random way, or in accordance with the number of the video calls that the first user made with the respective user, or in any other way, which is not limited herein.

Specifically, in carrying out this step, if the first user is not in the waiting list of the user as determined in any instant communication room, it is determined whether there is any other user in the waiting list of the user as determined in any instant communication room, and step 212 is carried out if there is no any other user in the waiting list of the user as determined in any instant communication room. If the first user is in the waiting list of the user as determined in any instant communication room, it is determined whether it is the turn of the first user to be added in, and step 212 is carried out if it is the turn of the first user.

Step 212: prompting the user about whether to enter the instant communication room R, determining whether an instruction from the first user to enter the instant communication room R is received, proceeding to step 213 if the instruction from the user is received, proceeding to step 202 if the instruction from the user is not received.

Step 213: determining whether the first user meets a condition for entering the corresponding instant communication room R, proceeding to step 214 if the first user meets the condition, proceeding to step 216 if the first user does not meet the condition.

The condition for entering the instant communication room refers to the audio and video related condition needed for the instant communication room, such as video resolution or the like.

Step 214: setting the first user in the corresponding instant communication room for performing instant communication, determining whether the first user is in the waiting list of the user corresponding to the instant communication room R, proceeding to step 215 if the user first is in the waiting list, proceeding to step 218 if the first user is not in the waiting list.

Step 215: deleting the user from the waiting list, and proceeding to step 218.

Step 216: prompting that the first user does not meet the condition for entering the instant communication room R, determining whether the first user is in the waiting list of the user corresponding to the instant communication room R, proceeding to step 217 if the first user is in the waiting list, proceeding to step 202 if the first user is not in the waiting list.

Step 217: deleting the user from the waiting list, and proceeding to step 202.

Step 218: determining whether an instruction from the first user to exit from the corresponding instant communication room R is received, enabling the first user to exit from the corresponding instant communication room R if the instruction is received and proceeding to step 202, or proceeding to step 219 if the instruction is not received.

Step 219: inquiring among the users in the following list, determining whether there exists any user in the following list who accepts the first user to enter the instant communication room R1 in which he resides, proceeding to step 220 if there exists any user who accepts the first user to enter the instant communication room in which he resides, proceeding to step 221 if there does not exist such a user who accepts the first user to enter the instant communication room in which he resides.

Step 220 (shown in FIG. 2*d*): prompting the first user about whether to enter the instant communication room R1, determining whether an instruction from the first user to enter the instant communication room R1 is received, proceeding to step 213 if the instruction from the first user is received, proceeding to step 221 if the instruction from the first user is not received.

Step 221: determining whether an instruction from the first user to follow a third user who resides in the same instant communication room as the first user is received, proceeding to step 222 if the instruction is received, proceeding to step 218 if the instruction is not received.

Step 222: determining whether the third user forbids the first user to follow, proceeding to step 223 if the third user forbids the first user to follow, proceeding to step 224 if the third user does not forbid the first user to follow.

The third user in the same instant communication room as the first user may forbid the first user to follow by dragging the first user into a black list or in other ways, which is not limited herein and can be set as required.

Step 223: prompting the first user that the third user forbids the first user to follow, and proceeding to step 218.

Step 224: determining whether the third user has a preset attribute, proceeding to step 226 if the third user has the preset attribute, proceeding to step 225 if the third user does not have the preset attribute.

Step 225: prompting that the third user does not have the preset attribute, and proceeding to step 218.

Step 226: determining whether the number of the users in the following list is beyond a preset number threshold, proceeding to step 228 if the number of the users in the following list is beyond the preset number threshold, proceeding to step 227 if the number of the users in the following list is not beyond the preset number threshold.

Step 227: determining whether the third user is in the following list, proceeding to step 230 if the third user is in the following list, proceeding to step 229 if the third user is not in the following list.

Step 228: prompting the number of users in the following list has reached the upper limit, and proceeding to step 218.

Step 229: adding the third user to the following list, and proceeding to step 230.

Step 230: determining whether the third user needs to change the instant communication room, proceeding to step 218 if the third user does not need to change the instant communication room, proceeding to step 231 if the third user needs to change the instant communication room.

Step 231 (shown in FIG. 2*e*): determining whether the first user is allowed to be added to the changed instant communication room of the third user, proceeding to step 232 if the first user is allowed to be added to the changed instant communication room of the third user, proceeding to step 233 if the first user is not allowed to be added to the changed instant communication room of the third user.

The specific operation of step 231 is similar to that of step 211, and is not described in detail here.

Step 232: prompting for the first user whether to enter the changed instant communication room of the third user, determining whether an instruction from the first user to enter the changed instant communication room of the third user is received, proceeding to step 213 if the instruction from the first user to enter the changed instant communication room of the third user is received, proceeding to step 218 if the instruction from the first user to enter the changed instant communication room of the third user is not received.

Step 233: adding the first user to the waiting list of the third user, determining whether a preset waiting time has passed, proceeding to step 218 if the preset waiting time has passed, and proceeding to step 231 if the preset waiting time has not passed.

Step 234: obtaining a staying time from the time the first user logs into the instant communication interface, determining whether the staying time is beyond a preset period of time, proceeding to step 235 if the staying time is beyond the preset period of time, proceeding to step 202 if the staying time is not beyond the preset period of time.

The preset period of time can be set as required, which can be 5 minutes, 10 minutes or the like.

Step 235: prompting whether the first user selects to enter an instant communication room using an automatic matching mode, determining whether an instruction from the first user to select to enter an instant communication room using an automatic matching mode is received, proceeding to step 236 if the instruction from the first user to select to enter an instant communication room using an automatic matching mode is received, proceeding to step 202 if the instruction from the first user to select to enter an instant communication room using an automatic matching mode is not received.

Step 236: matching the first user to an instant communication room with a preset automatic matching mode, and proceeding to step 213.

Specifically, the preset automatic matching includes: obtaining characteristic parameters of the first user and characteristic parameters of the user who is allowed to be added to the instant communication room that has the vacancy; comparing the characteristic parameters of the first user with the characteristic parameters of the user who is allowed to be added to the instant communication room that has the vacancy, and obtain the instant communication room matching the first user.

The characteristic parameters of the first user include a basic characteristic parameter and a derived characteristic parameter, with the basic characteristic parameter including age, gender and/or geographic location, and the like, and the derived characteristic parameter including education, social stratum, income level, opening index and/or network charm index, and the like.

The basic characteristic parameter, such as age, gender and geographic location, can be obtained from the information that is submitted by the user. The derived characteristic parameter, such as education, social stratum, income level, opening index and charm index can be obtained as follows: the highest education of the user can be obtained based on the group or community in which the user participates, or the information that is submitted by the user; the social stratum of the user (which can be middle-class, student, migrant worker, or the like) can be determined based on the internet accessing circumstance of the user (such as office, internet bar, or school), IP address (different positions in different geographic locations corresponding to different IP addresses) or the like; the income level of the user can be determined based on the mobile terminal that is used by the user; the opening index of the user can be determined based on the action that is made by the user in the QQ group; and the charm index of the user can be generated based on the behavior of the user in the presence of a heterogenderual friend.

Further, it is to be noted that the characteristic parameters of the first user will change with time, thus the characteristic parameters of the first user need to be updated. For example, some characteristic parameters (such as age, gender and geographic location) are updated at a preset interval, or some characteristic parameters (such as opening index, charm index and the like) are updated based on the chatting of the first user in the video room.

The opening index and the charm index can be updated as follows.

The opening index $f(x)$: $f(x)=a0+a1*x$.

Where a0 is an initial value of the opening index (which is generated based on the action of the user in the QQ group and the like), a1 is a weighting value of the opening index (which can be set as required, such as 0.9 or 2), and x is the activity degree of the user in the video room (which can be determined based on the number and contents of the chatting posts made by the user).

The charm index: $f(y)=b0+b1*y$.

Where b0 is an initial value of the charm index (which is generated based on the behavior of the user in the presence of a heterogenderual friend), b1 is a weighting value of the charm index, and x is the charm degree of the user in the video room (which can be determined based on the number of heterogenderual followers).

It is to be noted that in the setting of the characteristic parameters of the first user, one or more parameters may be selected from the basic characteristic parameter such as age, gender and geographic location and the derived characteristic parameter such as education, social stratum, income level, opening index and network charm index, which can be set as required and is not limited herein here.

The characteristic parameters of the user that is allowed to be added to the instant communication room having vacancy can be obtained as follows.

A preset characteristic standard parameter xsi (which is usually an optimal characteristic standard parameter, and if the user characteristic of the instant communication room meets the preset characteristic standard parameter, the chatting has the most perfect effect) is set for the characteristic parameter of each user in the instant communication room. For example, for the gender parameter of the instant communication room, a preset male-to-female ratio (such as 1:1) is set; for the age parameter of the instant communication room, a preset average age and a maximum age difference are set; and for the geographic location parameter of the instant communication room, a preset geographic location range value is set. The score of the each user characteristic of the instant communication room is $f(xi)=xi-xsi$, where xi is the actual user characteristic parameter of the instant communication room currently, and xsi is the preset characteristic standard parameter. The smaller $f(xi)$ is preferable, i.e., the actual characteristic parameter that is closer to the preset characteristic standard parameter is preferable. The total score of all the user characteristics of the instant communication room is $f=\Sigma ai*f(xi)$, where ai is a weighting value (which represents the importance of the corresponding user characteristic to the instant communication room, and can be set as required).

For adding a user to the instant communication room having the vacancy on the basis of the existing users in the instant communication room, all the combinations of the user characteristics are traversed to find the optimal combination which has the smallest f, so that all the characteristic parameters of the user that is allowed to be added to the instant communication room are obtained.

It is to be noted that the specific value of each characteristic standard parameter can be set in advance as required, and the value of each characteristic standard parameter can be updated as required. For example, information about the chatting in each instant communication room can be collected, the value of each characteristic standard parameter corresponding to the instant communication room with more chatting contents and long chatting time is obtained, and the value of each characteristic standard parameter corresponding to the other instant communication rooms is updated accordingly.

For example, 6 users can be set for one instant communication room, and the characteristic parameters of the user may be set as the gender and the geographic location. Currently there are 2 users, one has the characteristic parameters of male and Beijing, and the other has the characteristic parameters of female and Hebei. Assuming that the preset standard parameter for the gender is a male-to-female ratio of 1:1 and the preset standard parameter for the geographic location is Beijing or Hebei, all the combinations of the user characteristics are traversed under the conditions that the gender of the No. 3 user is male or female and the geographic location of the No. 3 user is Beijing or Hebei. Thus, the characteristic parameters of the user who is allowed to be added to this instant communication room are: male, Beijing; male, Hebei; female, Beijing; or female, Hebei. If the first user has the characteristic parameters of the user that is allowed to be added to this instant communication room, the first user is added to this instant communication room.

It is to be noted that there may be multiple instant communication rooms which match the characteristic parameters of the first user, and then one instant communication room can be selected randomly from the multiple instant communication rooms. There may be no instant communication room which matches the characteristic parameters of the first user, and then a new instant communication room can be built for the first user.

Step 237: prompting that the upper limit of the following number has been reached, and proceeding to step 202.

Specifically, if it is prompted that the upper limit of the following number has been reached, the first user can not select a new one from the users on the head wall, but can only select one from the users in the following list for following. Alternatively, the first user can delete some users from the following list, and then select a new one form the users on the head wall for following.

Step 238: prompting that the selected object to follow does not have the preset attribute, and proceeding to step 202.

Specifically, the preset attribute can be set according to specific applications. For example, for match-making and friend-making, the preset attributes can be set to include opposite gender, root, residence, school and the like.

It is determined whether an instruction from the first user to click to follow an object in the same instant communication room as the first user is received, and it is determined whether there is an object for the first user to follow, who has been followed by the first user.

Step 239: prompting the first user to re-select the object to follow, and proceeding to step 202.

Step 240: adding the first user to the waiting list of the on-line user, and proceeding to step 241.

Step 241: determining whether the waiting time of the first user is beyond a preset waiting time threshold, proceeding to step 235 if the waiting time of the first user is beyond the preset waiting time threshold, proceeding to step 207 if the waiting time of the first user is not beyond the preset waiting time threshold.

The preset waiting time threshold may be 1 minute, 2 minutes or the like, which may be set as required.

Step 242: determining whether the selected object to follow is in any instant communication room, proceeding to step 243 if the selected object to follow is in any instant communication room, proceeding to step 246 if the object to follow is not in any instant communication room.

Step 243: determining whether the first instant communication room has vacancy, proceeding to step 244 if the first instant communication room has vacancy, proceeding to step 246 if the first instant communication room has no vacancy.

Step 244: determining whether the first user is allowed to be set into the first instant communication room, proceeding to step 245 if the first user is allowed to be set into the first instant communication room, proceeding to step 246 if the first user is not allowed to be set into the first instant communication room.

The operation of the step 244 is similar to that of step 211, which is not described in detail here.

Step 245: prompting for the first user whether to enter the first instant communication room, determining whether an instruction from the first user to enter the first instant communication room is received, proceeding to step 213 if the instruction from the first user to enter the first instant communication room is received, proceeding to step 202 if the instruction from the first user to enter the first instant communication room is not received.

Step 246: adding the user to the waiting list of the object to follow, and proceeding to step 241.

Step 247: adding the first user to the waiting list of the user as determined in any instant communication room, and proceeding to 241.

It is to be noted that a button or option is set on the instant communication interface for exiting from the instant communication system, which can be clicked if the user wants to exit from the instant communication system at any time.

With the method according to the embodiment of the disclosure, after the information that a first user is logged into an instant communication interface is obtained, on-line users are displayed, information about an object to follow selected by the first user from the on-line users is received, and the user is set into a first instant communication room in which the object to follow resides, for performing instant communication. Hence, the user does not need to propose a request for instant communication to a determined counterpart, the communication between strangers is facilitated for there is no limitation on the users, and the efficiency of making friends is enhanced. While the on-line users are displayed, the following list can be displayed, so that the first user can select the object to follow from the on-line users or from the following list, for expanding the selection range. Further, the first user can select by himself to enter the first instant communication room, which is flexible and convenient for the user. In addition, it is convenient that an instant communication room can be matched with the user automatically.

Figure 5:
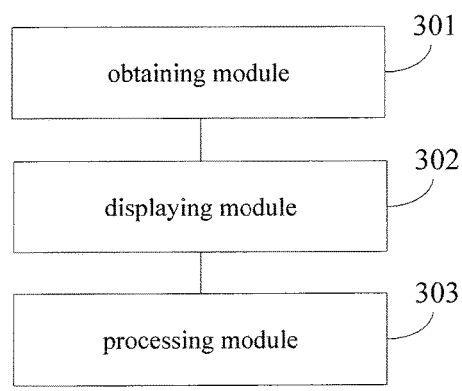
FIG. 5 is a schematic structural diagram of a device for implementing instant communication according to an embodiment of the disclosure.

Referring to FIG. 5, a device is provided for implementing instant communication according to an embodiment of the disclosure, and the device may include:

an obtaining module 301, configured to obtain information that a first user is logged into an instant communication interface;

a displaying module 302, configured to display on-line users to the first user in response to the login of the first user; and a processing module 303, configured to receive, in response to the first user selecting an object to follow from the on-line users, information about the object to follow, and set the first user into a first instant communication room in which the object to follow resides, for performing instant communication.

In an exemplary implementation, the displaying module 302 may include:

a displaying unit, configured to display a following list of the first user based on the information that the first user is logged into the instant communication interface, wherein the following list includes a name and/or identity number of at least one user who has been followed by the first user.

The processing module 303 may include:

a processing unit, configured to receive, in response to the first user selecting the object to follow from the following list, information about the object to follow.

In an exemplary implementation, the processing module may further include:

a setting unit, configured to, in the case that a preset instant communication condition is met, set the first user into the first instant communication room, for performing instant communication, wherein the preset instant communication condition includes at least one of: whether the selected object to follow has a preset attribute, whether the number of the users in the following list is beyond a preset number threshold, whether the selected object to follow is in the following list, whether a current state of the selected object to follow is an on-line state, whether the selected object to follow is in any instant communication room, whether the first instant communication room has vacancy, whether it is possible to set the first user into the first instant communication room, whether an instruction from the first user to enter the first instant communication room is received, and whether the first user meets a condition for entering the first instant communication room.

Figure 6:
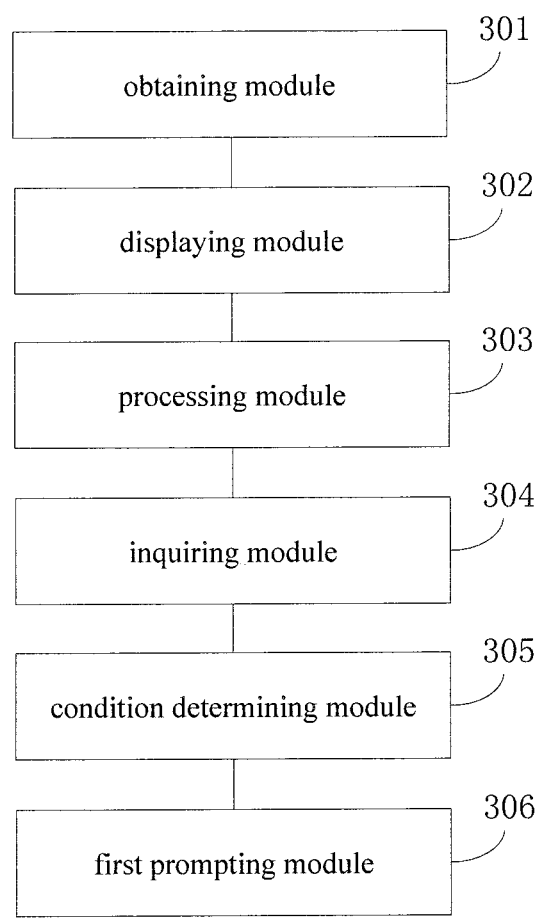
FIG. 6 is a schematic structural diagram of a device for implementing instant communication according to an embodiment of the disclosure.

In an exemplary implementation, referring to FIG. 6, the device may further include:

an inquiring module 304, configured to inquire among the users in the following list, and select a second user from the users in the following list, wherein the second user accepts the first user to enter a second instant communication room in which the second user resides;

a condition determining module 305, configured to determine whether the first user meets a condition for entering the second instant communication room; and a first prompting module 306 prompt that the first user does not meet the condition for entering the second instant communication room if it is determined that the first user does not meet the condition for entering the second instant communication room.

Figure 7:
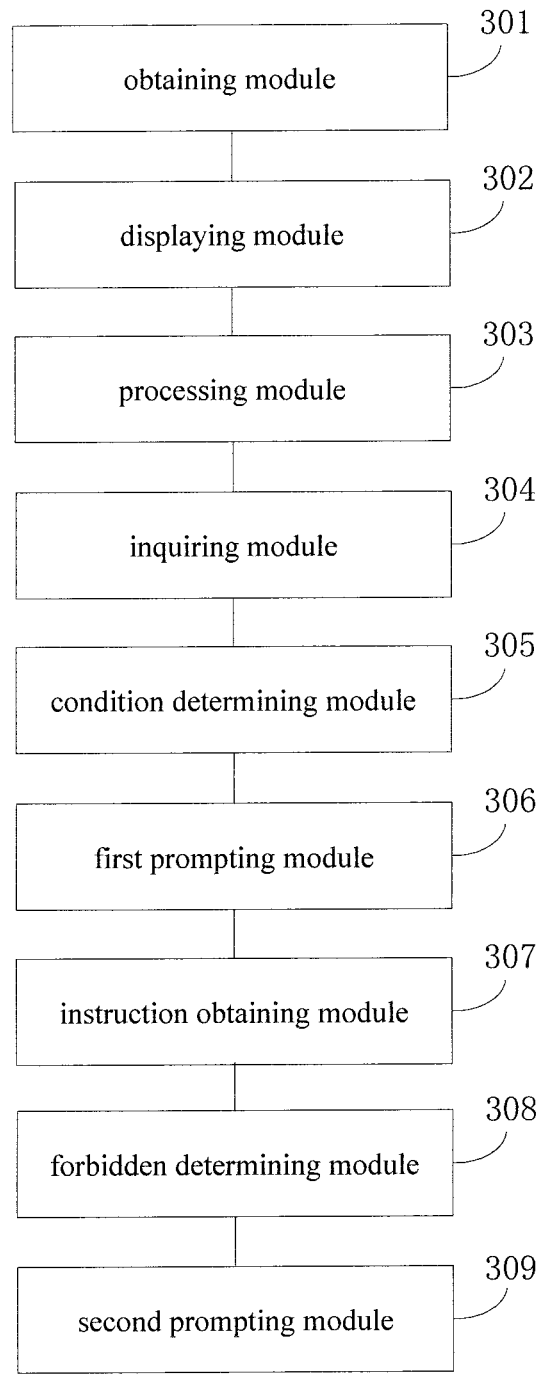
FIG. 7 is a schematic structural diagram of a device for implementing instant communication according to an embodiment of the disclosure.

In an exemplary implementation, referring to FIG. 7, the device may further include:

an instruction obtaining module 307, configured to obtain an instruction from the first user to follow a third user who resides in the same instant communication room as the first user;

a forbidding determining module 308, configured to determine whether the third user forbids the first user to follow; and a second prompting module 309, configured to, in instances when it is determined by the forbidding determining module 308 that the third user forbids the first user to follow, prompt that the third user forbids the first user to follow.

In an exemplary implementation, the processing module 303 may further include:

a first adding unit, configured to, when the first instant communication room has no vacancy, add the user to a waiting list of the object to follow; and a matching unit, configured to match the user to an instant communication room using the preset automatic matching mode if waiting time of the first user is beyond a preset waiting time threshold, and an instruction from the first user to select to enter an instant communication room using an automatic matching mode is received.

In an exemplary implementation, the processing module 303 may further include:

a second adding unit, configured to, in instances when it is determined not to be possible to set the first user into the first instant communication room, add the user to a waiting list of the object to follow.

In an exemplary implementation, the matching unit may include:

an obtaining sub-unit, configured to obtain characteristic parameters of the first user and characteristic parameters of a user who is allowed to be added to the instant communication room that has the vacancy, wherein the characteristic parameters of the first user includes a basic characteristic parameter and a derived characteristic parameter, with the basic characteristic parameter including at least one of age, gender and geographic location, and the derived characteristic parameter including at least one of education, social stratum, income level, opening index and network charm index; and a matching sub-unit, configured to compare the characteristic parameters of the first user with the characteristic parameters of the user who is allowed to be added to the instant communication room that has the vacancy, and obtain the instant communication room matching the first user.

After the information that a first user is logged into an instant communication interface is obtained, the device may display on-line users, information about an object to follow selected by the first user from the on-line users is received, and the first user is set into a first instant communication room in which the object to follow resides, for performing instant communication. Hence, the first user does not need to propose a request for instant communication to a specified counterpart and communication between strangers is facilitated for there may be no limitation on the users, and the efficiency of making friends is enhanced. While the on-line users are displayed, the following list may be displayed, so that the first user can select the object to follow from the on-line users or from the following list, for expanding the selection range. Further, the first user can select to enter the first instant communication room, which is a flexible and convenient feature for the user. In addition, it is convenient that an instant communication room can be matched with the user automatically.

It is to be noted that although the device for implementing the instant communication according to the embodiments of the disclosure is described as being divided into the above exemplary functional modules, in practice, the above functions may be achieved by different functional modules as required, for example, the device may be divided into different functional modules for implementing all or some of the above functions. Further, the device for implementing the instant communication may be based on a same concept as that of the method for implementing the instant communication according to the above embodiments and for a specific implementation of the device, one may refer to the description of the method, which will not be repeated herein.

The above embodiments of the disclosure are numbered only for illustration but not for ranking the embodiments.

It can be understood by those skilled in the art that all or some of the steps of the above embodiments can be implemented by hardware, or can be implemented by instructing related hardware with a program, which can be stored in a computer-readable storage medium, such as ROM, magnetic disk, or optical disk. For example, it can be understood by those skilled in the art that the method for implementing instant communication may be achieved by processing units including CPU (central processing unit) or general computing device and storage units including RAM or ROM for storing programs, and accordingly the device for implementing instant communication according to the disclosure may be constructed by the processing units and the storage units.

The above described are only preferred embodiments of the invention, and are not intend to limit the disclosure. Any

We claim:

1. A method for implementing instant communication, comprising:
    obtaining information that a first user is logged into an instant communication interface on a client terminal;
    displaying on-line users on a graphic user interface to the first user in response to the login of the first user, the displayed users including stranger users to the first user; and
    receiving, in response to the first user selecting a user to follow from the stranger users presented on the graphic user interface, information about the selected user to follow;
    determining whether a first instant communication room in which at least one user resides has vacancy for adding a user to an instant communication session hosted in the first instant communication room, the at least one user including the selected user, wherein the instant communication session facilitates instant online text, audio, or video conversations among participated users residing in the first instant communication room, a quantity of the participated users being less than a predetermined value;
    setting the first user into the first instant communication room in response to the first instant communication room having vacancy;
    performing, in the first instant communication room, the instant communication between the first user and each of the at least one user;
    in response to the first instant communication room having no vacancy, adding the first user to a waiting list of the first instant communication room; and
    in response to an instruction from the first user to enter an instant communication room using a preset automatic matching mode being received, assigning the first user to a matched instant communication room automatically selected based on characteristic parameters of the first user, users in the matched instant communication room are stranger users to the first user.

2. The method according to claim 1,
    wherein the displaying on-line users to the first user in response to the login of the first user comprises:
    displaying a following list of the first user, wherein the following list comprises a name and/or an identity number of at least one user who has been followed by the first user; and
    the receiving, in response to the selection by the first user of the user to follow comprises:
    receiving, in response to the first user selecting the user to follow from the following list, information about the selected user to follow.

3. The method according to claim 2, wherein the setting the first user into the first instant communication room comprises:
    setting the first user into the first instant communication room in instances when a preset instant communication condition is met, wherein the preset instant communication condition comprises at least one of:
    whether the selected user to follow has a preset attribute,
    whether the number of the users in the following list is beyond a preset number threshold,
    whether the selected user to follow is in the following list,
    whether a current state of the selected user to follow is an on-line state,
    whether the selected user to follow is in any instant communication room,
    whether it is possible to set the first user into the first instant communication room,
    whether an instruction from the first user to enter the first instant communication room is received, and
    whether the first user meets a condition for entering the first instant communication room.

4. The method according to claim 2, further comprising:
    after setting the first user into the first instant communication room, inquiring among users in the following list, and selecting a second user from the users in the following list, wherein the second user accepts the first user to enter a second instant communication room in which the second user resides;
    in instances when an instruction from the first user to enter the second instant communication room is received, determining whether the first user meets a condition for entering the second instant communication room; and
    in instances when the first user does not meet the condition for entering the second instant communication room, prompting that the first user does not meet the condition for entering the second instant communication room.

5. The method according to claim 4, further comprising:
    in instances when the instruction from the first user to enter the second instant communication room is not received:
    obtaining an instruction from the first user to follow a third user who resides in the same instant communication room as the first user; and
    determining whether the third user forbids the first user to follow; and
    in instances when the third user forbids the first user to follow, prompting that the third user forbids the first user to follow.

6. The method according to claim 3, further comprising:
    in instances when it is determined not possible to set the first user into the first instant communication room, adding the first user to a waiting list of the selected user to follow.

7. The method according to claim 1, wherein assigning the first user to the matched instant communication room:
    obtaining the characteristic parameters of the first user and characteristic parameters of a user who is allowed to be added to a to-be-matched instant communication room that has a vacancy, wherein the characteristic parameters of the first user comprises a basic characteristic parameter and a derived characteristic parameter, with the basic characteristic parameter comprising at least one of age, gender and geographic location, and the derived characteristic parameter comprising at least one of education, social stratum, income level, opening index and network charm index; and
    comparing the characteristic parameters of the first user with the characteristic parameters of the user who is allowed to be added to a to-be-matched instant communication room that has the vacancy, and obtaining the instant communication room matching the first user.

8. A device for implementing instant communication, comprising a memory, a display module, and one or more processor, wherein:
    the one or more processor is configured to obtain information that a first user is logged into an instant communication interface on a client terminal;
    the displaying module is configured to display on-line users to the first user on a graphic user interface in response to the login of the first user, the displayed users including stranger users to the first user; and the one or more processor is further configured to:
receive, in response to the first user selecting a user to follow from the stranger users presented on the graphic user interface, information about the selected user to follow;
determine whether a first instant communication room in which at least one user resides has vacancy, the at least one user including the selected user;
set the first user into a first instant communication room in response to the first instant communication room having vacancy for adding a user to an instant communication session hosted in the first instant communication room, the at least one user including the selected user, wherein the instant communication session facilitates instant online text, audio, or video conversations among participated users residing in the first instant communication room, a quantity of the participated users being less than a predetermined value;
perform, in the first instant communication room, the instant communication at least between the first user and each of the at least one user;
in response to the first instant communication room having no vacancy, add the first user to a waiting list of the first instant communication room; and
in response to an instruction from the first user to enter an instant communication room using a preset automatic matching mode being received, assign the first user to a matched instant communication room automatically selected based on characteristic parameters of the first user, users in the matched instant communication room are stranger users to the first user.

9. The device according to claim 8, wherein
the displaying module is further configured to display a following list of the first user, wherein the following list comprises a name and/or an identity number of at least one user who has been followed by the first user, and
the one or more processor is further configured to receive, in response to the selection by the first user of the user to follow from the following list, information about the selected user to follow.

10. The device according to claim 9, wherein the one or more processor is further configured to set the first user into the first instant communication room in instances when a preset instant communication condition is met,
wherein the preset instant communication condition comprises at least one of:
whether the selected user to follow has a preset attribute,
whether the number of the users in the following list is beyond a preset number threshold,
whether the selected user to follow is in the following list,
whether a current state of the selected user to follow is an on-line state,
whether the selected user to follow is in any instant communication room,
whether it is possible to set the first user into the first instant communication room,
whether an instruction from the first user to enter the first instant communication room is received, and
whether the first user meets a condition for entering the first instant communication room.

11. The device according to claim 9, the one or more processor is further configured to:
inquire among the users in the following list after setting of the first user into the first instant communication room, and select a second user from the users in the following list, wherein the second user accepts the first user to enter a second instant communication room in which the second user resides;
determine whether the first user meets a condition for entering the second instant communication room when an instruction from the first user to enter the second instant communication room is received; and
prompt that the first user does not meet the condition for entering the second instant communication room in instances when it is determined that the first user does not meet the condition for entering the second instant communication room.

12. The device according to claim 10, wherein the one or more processor is further configured to, in instances when it is determined not to be possible to set the first user into the first instant communication room, add the first user to a waiting list of the selected user to follow.

13. The device according to claim 8, wherein the one or more processor is further configured to:
obtain the characteristic parameters of the first user and characteristic parameters of a user who is allowed to be added to a to-be-matched instant communication room that has a vacancy, wherein the characteristic parameters of the first user comprises a basic characteristic parameter and a derived characteristic parameter, with the basic characteristic parameter comprising at least one of age, gender and geographic location, and the derived characteristic parameter comprising at least one of education, social stratum, income level, opening index and network charm index; and
compare the characteristic parameters of the first user with the characteristic parameters of the user who is allowed to be added to t a to-be-matched he instant communication room that has the vacancy, and obtain the instant communication room matching the first user.

14. A non-transitory computer-readable medium comprising a plurality of instructions executable by a processor for:
obtaining information that a first user is logged into an instant communication interface on a client terminal;
displaying on-line users on a graphic user interface to the first user in response to the login of the first user, the displayed users including stranger users to the first user; and
receiving, in response to the first user selecting a user to follow from the stranger users presented on the graphic user interface, information about the selected user to follow;
determining whether a first instant communication room in which at least one user resides has vacancy for adding a user to an instant communication session hosted in the first instant communication room, the at least one user including the selected user, wherein the instant communication session facilitates instant online text, audio, or video conversations among participated users residing in the first instant communication room, a quantity of the participated users being less than a predetermined value;
setting the first user into the first instant communication room in response to the first instant communication room having vacancy;
performing, in the first instant communication room, the instant communication between the first user and each of the at least one user;
in response to the first instant communication room having no vacancy, adding the first user to a waiting list of the first instant communication room; and in response to an instruction from the first user to enter an instant communication room using a preset automatic matching mode being received, assigning the first user to a matched instant communication room automatically selected based on characteristic parameters of the first user, users in the matched instant communication room are stranger users to the first user.

15. The non-transitory computer-readable medium of claim 14, wherein:
the displaying on-line users to the first user in response to the login of the first user comprises:
displaying a following list of the first user, wherein the following list comprises a name and/or an identity number of at least one user who has been followed by the first user; and
the receiving, in response to the selection by the first user of the user to follow comprises:
receiving, in response to the first user selecting the user to follow from the following list, information about the selected user to follow.

16. The non-transitory computer-readable medium of claim 15, wherein the setting the first user into the first instant communication room in which the selected object to follow resides comprises:
setting the first user into the first instant communication room in instances when a preset instant communication condition is met, wherein the preset instant communication condition comprises at least one of:
whether the selected user to follow has a preset attribute,
whether the number of the users in the following list is beyond a preset number threshold,
whether the selected user to follow is in the following list,
whether a current state of the selected user to follow is an on-line state,
whether the selected user to follow is in any instant communication room,
whether it is possible to set the first user into the first instant communication room,
whether an instruction from the first user to enter the first instant communication room is received, and
whether the first user meets a condition for entering the first instant communication room.

17. The method according to claim 1, wherein:
the first instant communication room is at least one of: a chat room for instant audio and video communication between users in the chat room, and a video game room where the users in the video game room participate in a same game session together.

18. The method according to claim 1, further comprising:
determining whether the selected user resides in any instant communication room;
when it is determined that the selected user resides in an instant communication room, determining whether the first instant communication room in which the selected user resides has vacancy; and
when it is determined that the selected user does not reside in any instant communication room,
matching, using a preset automatic matching mode, the first user to a second instant communication room in which one or more second users reside;
determining whether the second instant communication room in which the one or more second users reside has vacancy;
setting the first user into the second instant communication room in response to the second instant communication room having vacancy; and
performing, in the second instant communication room, the instant communication between the first user and the one or more second users.

19. The method according to claim 1, further comprising:
collecting information about instant communication rooms;
obtaining value of each characteristic standard parameter corresponding to a third instant communication room with more chatting contents and long chatting time, wherein the characteristic standard parameter is used to evaluate whether the characteristic parameters of the first user match users in a to-be-matched instant communication room; and
updating value of each characteristic standard parameter corresponding to other instant communication rooms according to the obtained value corresponding to the third instant communication room.

* * * * *